United States Patent [19]
Osako et al.

[11] 3,902,195
[45] Aug. 26, 1975

[54] MAGNETIC DISC MEMORY UNIT

[75] Inventors: Hiroyuki Osako, Hatano; Yasuo Matsumiya, Odawara, both of Japan

[73] Assignee: Hitachi, Ltd., Japan

[22] Filed: Aug. 9, 1973

[21] Appl. No.: 386,972

Related U.S. Application Data

[63] Continuation of Ser. No. 819,263, April 25, 1969.

[30] Foreign Application Priority Data

Apr. 30, 1968 Japan .............................. 43-28589
July 26, 1968 Japan .............................. 43-52464

[52] U.S. Cl. .............................................. 360/133
[51] Int. Cl. .......................................... G11b 23/02
[58] Field of Search ................. 360/133, 97, 98, 86

[56] References Cited

UNITED STATES PATENTS 3,509,992 5/1970 David et al. ........................ 360/133

*Primary Examiner*—Vincent P. Canney
*Attorney, Agent, or Firm*—Craig & Antonelli

[57] ABSTRACT

A magnetic disc memory unit which comprises a drive apparatus and an access mechanism, and in which a plurality of disc packs are mounted on the drive shaft of said drive apparatus in such a manner that they are disengageable from each other, whereby said magnetic disc memory unit is singly capable of performing the functions of at least two units with said one drive apparatus and said one access mechanism.

14 Claims, 5 Drawing Figures

MAGNETIC DISC MEMORY UNIT

This is a continuation of application Ser. No. 819,263 filed Apr. 25, 1969.

This invention relates to a magnetic disc memory unit.

In an electronic computing system a magnetic tape, a magnetic disc or a magnetic drum is being used as a file at the present time. Although it has been a fairly recent development, the use of magnetic disc is spreading gradually due to a number of meritorious features possessed thereby which are well known in the art.

The magnetic discs presently used are classified broadly into the pack-type and the cartridge-type, in either of which the recording medium can be exchanged and either of which has an infinite memory capacity. The cartridge-type is one in which a magnetic disc contained in a disc cartridge is connected with one disc driving means, while the pack-type is one in which a disc pack consisting of at least one magnetic disc and usually consisting of a plurality of magnetic discs is connected with disc driving means.

In using such a magnetic disc memory unit for performing an actual job, e.g. for performing some process using the information accumulated in one magnetic disc, it is possible that the information is inadvertently erased or re-written due to an erroneous operation or malfunctioning of the unit. Thus, it becomes necessary to memorize the same information on a separate magnetic disc for the purpose of protecting the memorized information. This means that at least two similar units must be provided. The cartridge-type magnetic disc unit is relatively cheap in price but comprises only one magnetic disc. Therefore, the memory capacity which can be used at one time is small and the unit is not adapted for use when a large amount of information is to be handled. On the other hand, the pack-type magnetic disc unit which generally comprises a large number of magnetic discs is relatively expensive and it is economically disadvantageous to provide two of such units, although they have a large memory capacity.

The magnetic disc memory unit according to the present invention, which comprises one drive apparatus and one access mechanism, is characterized by a plurality of disc packs mounted on the drive shaft of the drive apparatus in such a manner that they are disengageable from each other. Therefore, the magnetic disc memory unit of this invention is advantageous not only in that it singly is capable of performing the functions of at least two conventional units, but also in that it performs other valuable jobs in a simple manner, with the accompanying result that the efficiency of the associated electronic computing system is enhanced.

The primary object of the present invention is to provide an improved magnetic disc memory unit.

Another object of the invention is to provide a magnetic disc memory unit in which a plurality of disc packs, disengageable from each other, can be handled by one drive apparatus and one access mechanism.

Still another object of this invention is to provide a magnetic disc memory unit of the character described above in which any one of a plurality of disc packs, mounted on the drive apparatus, can be exchanged.

Still another object of the invention is to provide a magnetic disc memory unit of the character described above which is so constructed that malfunctioning due to unsatisfactory mounting of the disc pack can be avoided.

Still another object of the invention is to provide a magnetic disc memory unit of the character described above in which the disc pack can be mounted or demounted as it is contained in a casing.

These and other objects, features and advantages of the present invention will be apparent from the following description taken in conjunction with the accompanying drawings, in which.

Figure 3:
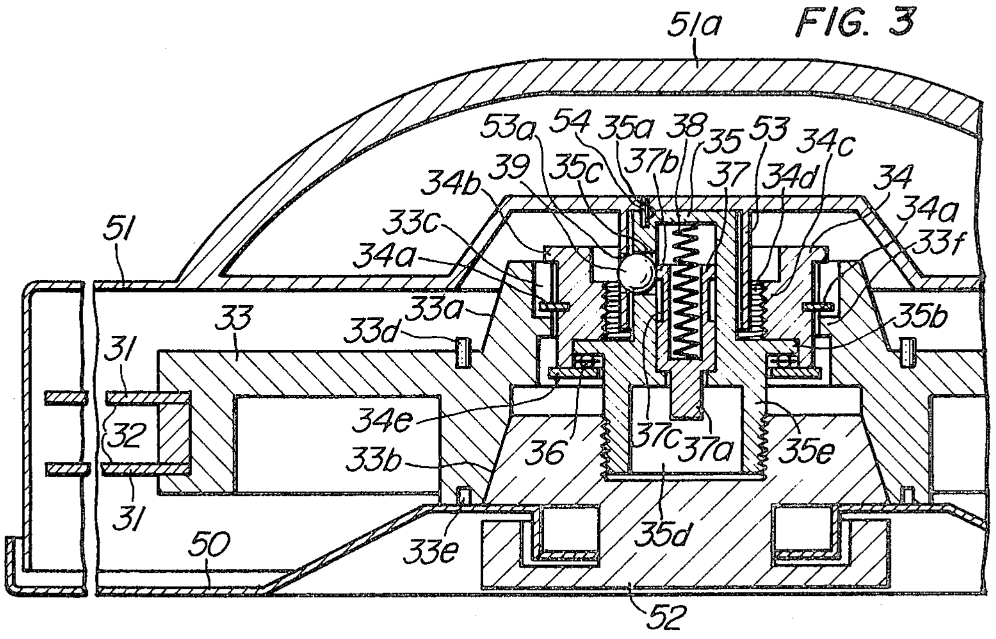
FIG. 3 is a fragmentary vertical cross-sectional side view, partly broken away, of a disc pack according to the present invention stored in a casing.
Figures 4A, 4B:
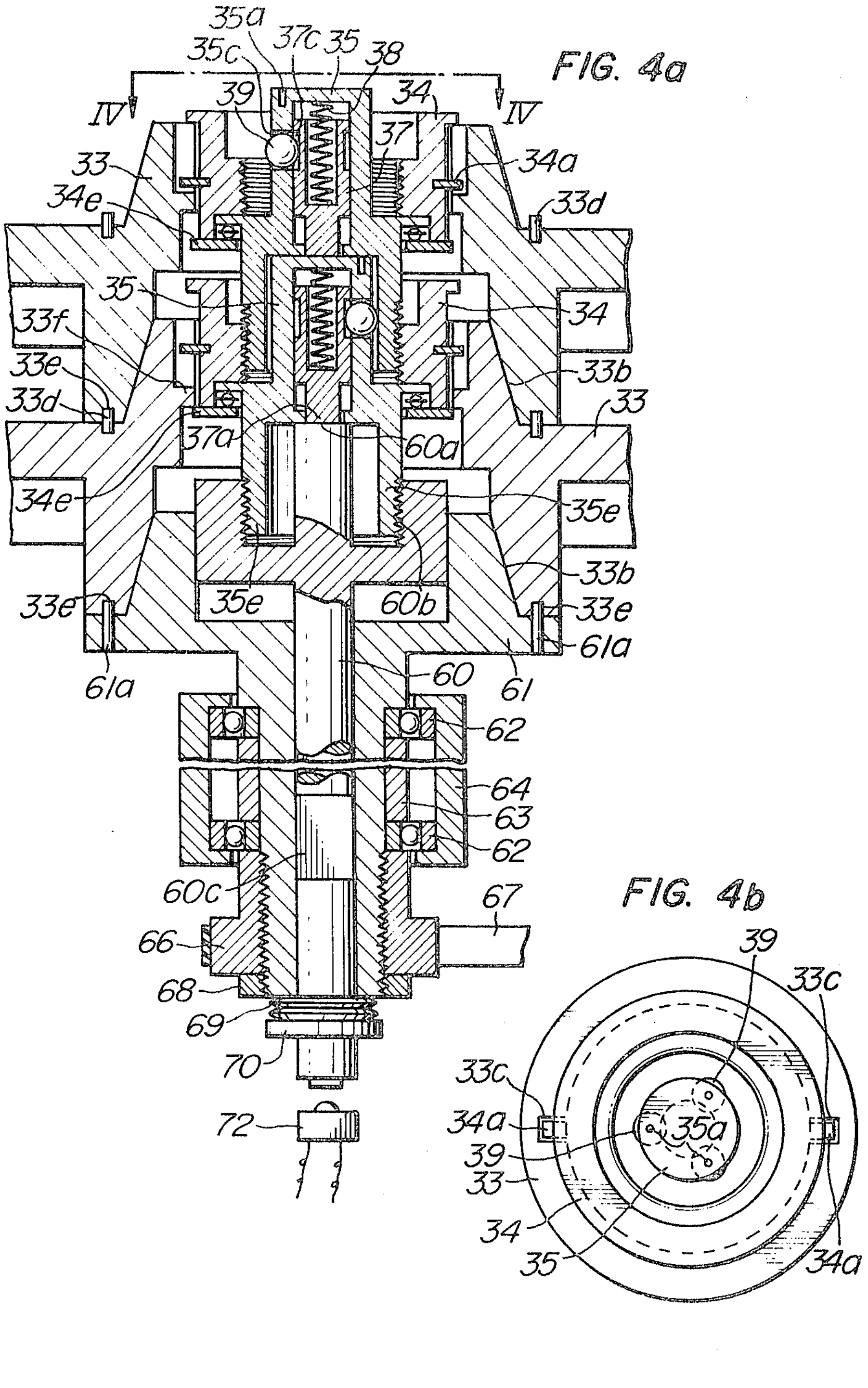

FIG. 4*a* is a fragmentary vertical cross-sectional side view of an embodiment of the present invention in which the disc packs shown in FIG. 3 are assembled; and FIG. 4*b* is a top plan view as viewed along the line IV—IV of FIG. 4*a*.

Figure 1:
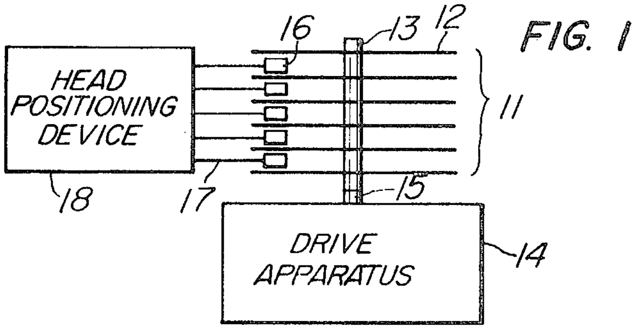
FIG. 1 is a schematic view showing a magnetic disc memory unit common in the art.

Referring to FIG. 1, there is shown schematically a pack-type magnetic disc memory unit. As seen, a plurality of magnetic discs 12, six of which are shown in the Figure, are fixedly mounted on a shaft 13 to compose a disc pack generally shown by numeral 11. The shaft 13 of the disc pack 11 is operatively connected to a rotary shaft 15 of a disc drive apparatus 14 to be driven thereby at a high rate. Magnetic heads 16 are provided each facing one face of each magnetic disc 12 and two magnetic heads 16 facing the opposed faces of two magnetic discs 12 are supported by one access arm 17. The access arms 17 are respectively supported by magnetic head positioning means 18. The magnetic head positioning means 18 includes, in addition to a mechanism for positioning the magnetic heads 16, an information writing and reading circuit connected to the magnetic heads 16. These component parts of the magnetic disc memory unit operate in the manner known in the art and will not be described herein. The magnetic disc memory unit of the construction described above is not capable of singly performing the function described previously.

Figure 2:
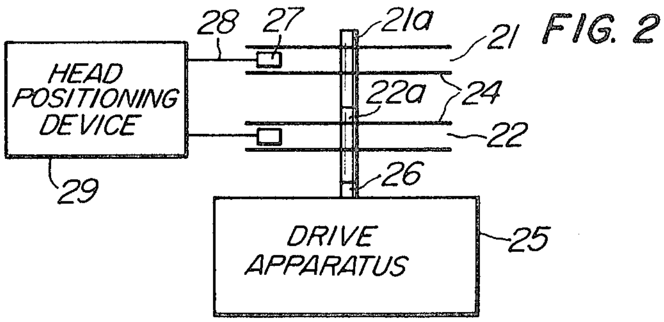
FIG. 2 is a schematic view for the purpose of explaining the outline of the magnetic disc memory unit according to the present invention.

FIG. 2 is a schematic view for the purpose of explaining the magnetic disc memory unit according to the present invention. In this Figure a disc drive apparatus is generally indicated by numeral 25 and one of the drive shafts 26 of said disc drive apparatus has a plurality of disc packs mounted thereon, each consisting of at least one magnetic disc, usually consisting of a plurality of magnetic discs. In the embodiment shown, two disc packs 21 and 22, each consisting of two magnetic discs 24, are mounted on the drive shaft 26. The disc packs 21 and 22 are mounted on shafts 21*a* and 22*a* respectively and are disengageably connected with the disc drive apparatus 25. Furthermore, the disc packs 21 and 22 are disengageable from each other. Magnetic heads 27 are disposed in confronting relation to the faces of the associated magnetic discs for magnetic engagement therewith and are each held in a position corresponding to a desired track by a magnetic head positioning device 29 through an arm 28. The magnetic head positioning device 29 includes, in addition to the magnetic head positioning mechanism, an information writing and reading circuit, etc., as in the magnetic disc memory unit described previously.

By employing the construction shown in FIG. 2 it is possible to operate a plurality of disc packs with one drive apparatus and one access mechanism, and accordingly the function described previously can be achieved with a single magnetic disc memory unit. Namely, in operating the magnetic disc memory unit of this invention the same information is recorded on the disc packs 21 and 22, and after demounting the disc pack 21, an information process can be operated using the information accumulated in the disc pack 22. In this way, the possibility of the information being lost can be eliminated because the same information is recorded and stored in the disc pack 21. Thus, it is possible to achieve the previously described function with a single unit. In addition, the magnetic disc memory unit of the construction described above is capable of performing other useful functions. For instance, with a system program recorded in the disc pack 22 and various data recorded in the disc packs 21, infinite data processing is possible by replacing one disc pack with another one having different data recorded therein.

As will be understood from the foregoing description, it is possible according to the present invention to obtain the functions of at least two magnetic disc memory units with one drive apparatus and one access mechanism, and also to exchange the disc packs as desired.

Now, the present invention will be further illustrated by way of an embodiment thereof.

FIG. 3 shows a disc pack according to this invention stored in a casing. In FIG. 3, about one third of the disc pack on the right side is not shown but the construction of the entire disc pack will be understood from this Figure because the disc pack is symmetrical with respect to the axis thereof. In this embodiment, one disc pack unit is composed of two magnetic discs 31. However, it should be understood that the disc pack can be composed of at least one magnetic disc. A magnetic recording medium is provided on the confronting faces 32 of the magnetic discs 31 because of production advantage and the fact that the outer surfaces are vulnerable to damage.

The magnetic discs 31 are secured to a hub 33. The hub 33 has a tapered projection 33*a* and a tapered cavity 33*b*, and also has pins 33*d* projecting upright from the upper surface and holes 33*e* formed in the undersurface thereof for the purpose to be described later. In the axial hole of the hub 33 are disposed a sleeve 34 and a lock screw 35. The sleeve 34 is provided within pins 34*a* which are in engagement with slits 33*c* formed in the hub 33. It will, therefore, be appreciated that the sleeve 34 is not rotatable relative to the hub 33. The sleeve 34 is supported by the hub 33, with its flange 34*b* resting on the top face of said hub. The inner surface of an inwardly bulged portion 34*c* of the sleeve 34 is provided with an internal thread 34*d*. The lock screw 35 is disposed extending through the axial hole of the sleeve 34. This lock screw 35 is formed with an annular projection 35*b* which is supported by an annular fitting 34*e*, fixed to the sleeve 34, through a thrust bearing 36. Thus, it will be seen that the lock screw 35 is rotatably supported by the sleeve 34. In the top surface of the lock screw 35 are provided three holes 35*a* equally spaced from each other at an angle of 120°. The lock screw 35 is also formed with three holes 35*c* equally spaced from each other at an angle of 120° and extending through the wall thereof, with a ball 39 disposed in each one of them. The lower portion of the lock screw 35 is extending downwardly as at 35*e* to define a cavity 35*d*, and the outer peripheral surface of the downwardly extending portion 35*e* is provided with an external thread. A piston 37 is disposed in the axial hole of the lock screw 35 for vertical sliding movement therein. The piston 37 is constantly biased downwardly by a compression spring 38, with the head 37*a* thereof projecting into the cavity 35*d* of the lock screw 35. In the position shown, a flange 37*b* of the piston 37 urges the balls 39, disposed in the respective holes 35*c*, outwardly. The piston 37 is also formed in the outside surface thereof with an annular recess 37*c* which will be in registration with the holes 35*c* when the piston 37 is pushed upwardly. The assembly of the above-described parts is generally referred to as disc pack.

A lower cover 50 and an upper cover 51 are combined with each other to form a disc-shaped casing. The lower cover 50 is provided with a rotatable fitting screw 52 which engages the external thread of the lock screw 35, whereby the lower cover is secured to the disc pack. The fitting screw 52 has a tapered projection complementary to the tapered cavity 33*b* of the hub 33, so that when the fitting screw 52 has been fitted on the lock screw 35, the tapered surfaces of both members are mated with each other, preventing said members from rattling.

The upper cover 51 is formed at the central portion with a guide 53 which is extending downwardly so as to surround the lock screw 35. Holes 53*a* slightly smaller than the holes 35*c* in the lock screw 35 are formed through the wall of the guide 53 at locations corresponding to said holes 35*c*, for receiving the balls 39 being urged outwardly by the flange 37*b* of the piston 37, whereby the upper cover 51 is locked on the lock screw 35. The upper cover 51 are also provided with three pins 54. These pins 54 are extending into the respective holes 35*a* formed in the top surface of the lock screw 35 and thereby the position of the upper cover is determined. Reference numeral 51*a* designates a handle. The disc pack is accommodated in the casing in the manner described above when it is not in use.

FIG. 4 is a sectional view of the two disc packs connected with a drive apparatus, both end portions of the disc packs being omitted for the purpose of simplicity. First of all, the drive apparatus will be described in detail. A housing 64 is fixed to a housing not shown. A spindle 61 is supported by ball bearings 62, a sleeve 63 for maintaining the space between the ball bearings and the housing 64. A pulley 66 is screw-threaded on the spindle 61 and supported by a supporting member 68 which is also screw-threaded on the spindle 61. The pulley 66 and therefore the spindle 61 are driven from a driving source (motor) not shown by way of a belt 67 engaging around said pulley. However, the spindle 61 is not allowed to rotate freely in the inoperative state of the memory unit, due to a brake force applied to the driving source. A vertically movable shaft 60 is inserted into the spindle 61, and a portion 60*c* of the shaft 60 and the corresponding portion of the spindle 61 have a rectangular cross section so that the rotation of the spindle 61 may be transmitted to the shaft 60. On the lower end portion of the shaft 60 is mounted a belleville spring 69 which is supported by a spring seat 70 fixed on the shaft 60. The belleville spring 69 serves to urge the shaft 60 downwardly, when the shaft 60 is moved upwardly, by being compressed between the spindle 61 and the spring seat 70. Provided immediately below the shaft 60 is a switch mechanism 72. When the disc packs are not mounted, the shaft 60 drops under the gravity, holding the switch 72 in a closed position.

The spindle 61 has at its top end a tapered surface complementary to the tapered surface 33*b* of the hub of the disc pack and pins 61*a* for engagement with the holes 33*e* formed in the disc pack. The shaft 60 has an internally threaded member 60*b* at the top end thereof for engagement with the lock screw 35 of the disc pack. The assembly of the shaft 60 and the spindle 61 is generally referred to as a driving shaft.

The disc pack stored in the casing as shown in FIG. 3 is mounted on the driving shaft in the following manner: First of all, the fitting screw 52 is unscrewed from the lock screw 35 to remove the lower cover 50 from the disc pack. Then, the disc pack, with the upper cover 51 connected therewith, is placed above the driving shaft and the hub 33 of the disc pack is set on the spindle 61, with the pins 61*a* received in the respective holes 33*e*. The external thread of the lock screw 35 is engaged with the internal thread 60*b* of the shaft 60 by revolving the upper cover 51. In this case, the lock screw 35 only is rotated by the upper cover 51 and the other parts are not rotated at all. During the process of engagement between the lock screw 35 and the shaft 60, the hub 33 and the sleeve 34 are not moved downwardly and accordingly the lock screw 35 is not moved downwardly, so that the shaft 60 is lifted upwardly. The head 60*a* of the shaft 60 is brought into contact with the piston head 37*a*, forcing the piston 37 into the lock screw 35. As a result, the annular recess 37*c* of the piston 37 is registered with the holes 35*c* in the lock screw 35 and the balls 39, being urged outwardly by the flange 37*b* are received in said annular recess. Thus, the engagement between the holes 53*a* in the guide 53 of the upper cover 51 and the balls 39 is released, rendering the upper cover 51 removable from the disc pack. By removing the upper cover, mounting of the first disc pack on the driving shaft is completed. Thereafter, the second disc pack is mounted on the first disc pack in the same manner as described above. In mounting the second disc pack on the first disc pack, the sleeve 34 and the lock screw 35 of the first disc pack are pulled up as a result of engagement between the lock screw of the second disc pack and the sleeve 34 of the first disc pack. Consequently, the shaft 61 is further moved upwardly. Where the memory unit is designed to be operative with two disc packs, the portion 34*e* of the sleeve 34 and a portion 33*f* of the hub 33 of the first disc pack are brought into contact with each other upon mounting the second disc pack on said first disc pack, and the contacts of the switch 72 are opened widest under this state. It will, therefore, be seen that by arranging the memory unit such that said memory unit is held inoperative in the closed state of the switch 72, a trouble resulting from incomplete mounting of the disc packs can be avoided.

For driving the disc packs, the spindle 61 is driven from the driving source, not shown, through the belt and the rotation of the spindle 61 is transmitted directly to the shaft 60. Namely, the driving shaft is driven from the driving source. The drive of the driving shaft is transmitted to the disc packs through the contact engagement between the tapered surfaces of the driving shaft and the disc packs, and also through the engagement between the pins 61*a* and the holes 33*e*. The engagement between the pins 33*d* on the hub 33 of one disc pack and the holes 33*e* formed in the hub of the adjacent disc pack also makes a contribution to the transmission of the driving force.

FIG. 4*b* is a view of the disc pack as viewed along the line IV—IV of FIG. 4*a*.

For demounting the disc pack, the upper cover 51 is placed on the disc pack, with the pins 64 received in the holes 35*a* in the lock screw 35, and revolved in a direction to disengage the lock screw 35 from the shaft 60. The piston 37 is forced to move outwardly of the lock screw 35, so that the balls 39 are forced outwardly by the flange of the piston 37, and received in the holes 53*a* of the guide 53. Thus, the upper cover 51 is locked with the disc pack and the disc pack can be demounted from the memory unit with the upper cover connected therewith.

According to this embodiment, the disc pack can optionally be replaced with a desired one to meet the purpose to be attained by the memory unit. Furthermore, the number of disc packs to be mounted can be selected to some extent by adjusting the switch mechanism and the clearance between the portion 34*e* of the sleeve 34 and the hub 33*f*.

What is claimed is:

1. A magnetic disc memory unit comprising information writing and reading means consisting of magnetic heads and an information writing and reading circuit, a magnetic head positioning mechanism for locating said magnetic heads in a desired track position on the surfaces of magnetic discs, a plurality of disc packs disengageable from each other and each consisting of at least one magnetic disc, and a disc drive apparatus for driving said plurality of disc packs by one driving shaft wherein each of said disc packs further comprises a hub having at least one magnetic disc secured thereto and having a tapered projection and a tapered cavity so as to be stacked together with other disc packs and said driving shaft, said hub being provided with an axial hole, a sleeve inserted into said axial hole of the hub and being moveable vertically within a predetermined distance with respect to said hub, said sleeve being provided with an axial hole having an internal thread therein, a lock screw inserted into said axial hole of the sleeve and being supported rotatably by said sleeve, said lock screw being provided with an external thread on the outer peripheral surface of the portion, said external thread of said lock screw being engageable with an internal thread at the top of said driving shaft, where said disc pack is the one stacked at the bottom of said plurality of disc packs, while said external thread of said lock screw being engageable with an internal thread of said sleeve where said disc pack is other than the one mentioned above, whereby said plurality of disc packs and said driving shaft can be engaged with each other by rotating said lock screw alone.

2. A magnetic disc memory unit comprising information writing and reading means consisting of magnetic heads and an information writing and reading circuit, a magnetic head positioning mechanism for locating said magnetic heads in a desired track position on the surfaces of magnetic discs, a plurality of disc packs disengageable from each other and each consisting of at least one magnetic disc, and a disc drive apparatus for driving said plurality of disc packs by one driving shaft wherein each of said disc packs further comprises:

a hub, on the outer radial portion of which is secured said at least one magnetic disc, said hub being provided with a tapered projection on one axial side thereof and a tapered cavity on the axial side thereof opposite said one side, whereby a plurality of said disc packs may be stacked together through engagement of their respective tapered projections and cavities, and being further provided with an axial hole therethrough;

a sleeve disposed within said axial hole of said hub and being vertically displaceable within a predetermined distance with respect to said hub, said sleeve being provided with an internal threaded axial hole therethrough;

means for engaging each disc pack within said plurality together and to said drive shaft, said means comprising a lock screw disposed within an extending through said internally threaded hole of said sleeve, said lock screw being provided with an external thread on the outer peripheral surface of one portion thereof, for engaging the internal thread of a sleeve of an adjacent disc pack; and wherein said drive shaft of said disc drive apparatus is provided with an internally threaded upper portion for engaging the external thread on the outer peripheral surface of the lock screw of said one of said disc packs, whereby said plurality of disc packs and said drive shaft are engaged with each other only through the rotation of said lock screw.

3. A magnetic disc memory unit comprising:

information writing and reading means consisting of magnetic heads and an information writing and reading circuit;

a mechanism for positioning said magnetic heads in a desired track position on the surface of magnetic discs;

a plurality of disc packs each consisting of at least one magnetic disc mounted on a shaft, each disc pack being adapted to be engageable mechanically and securely with each other by means of a mechanical coupling means provided on said shaft; and a disc drive apparatus for driving said plurality of disc packs as a unit by a single drive shaft through said shafts mounting the disc packs, said single drive shaft of said disc drive apparatus being provided with mechanical coupling means adapted to be engageable mechanically and securely with the shaft of the disc pack which is mounted at the bottom of said plurality of disc packs and wherein said shaft of each of said plurality of disc packs is further provided with a tapered projection and a tapered cavity to provide for stable mounting of said plurality of disc packs by mating the tapered projection of one disc pack with the tapered cavity of adjacent disc pack.

4. A magnetic disc memory unit comprising:

information writing and reading means consisting of magnetic heads and an information writing and reading circuit;

a mechanism for positioning said magnetic heads in a desired track position on the surface of magnetic discs;

a plurality of disc packs each consisting of at least one magnetic disc mounted on a shaft, each disc pack being adapted to be engageable mechanically and securely with each other by means of mechanical coupling means provided on said shaft; and a disc drive apparatus for driving said plurality of disc packs as a unit by a single drive shaft through said shafts mounting the disc packs, said single drive shaft of said disc drive apparatus being provided with mechanical coupling means adapted to be engageable mechanically and securely with the shaft of the disc pack which is mounted at the bottom of said plurality of disc packs and wherein said shaft of each of said plurality of the disc packs is further provided with a switch mechanism which is so arranged as to detect a predetermined number of disc packs having been mounted on said single drive shaft and through which said disc packs are driven.

5. A magnetic disc memory unit comprising:

information writing and reading means consisting of magnetic heads and an information writing and reading circuit;

a mechanism for positioning said magnetic heads in a desired track position on the surface of magnetic disc;

a plurality of disc packs, each consisting of at least one magnetic disc mounted on a shaft, each disc pack being adapted to be engageable mechanically and securely with each other by means of a thread provided on said shaft; and a disc drive apparatus for driving said plurality of disc packs as a unit by a single drive shaft through said shafts mounting the disc packs, said single drive shaft of said disc drive apparatus being provided with a thread adapted to be engageable mechanically and securely with the thread provided on the shaft of the disc pack which is mounted at the bottom of said plurality of disc packs.

6. A magnetic disc memory unit according to claim 5, wherein said shaft of each of said plurality of the disc packs is further provided with a tapered projection and a tapered cavity to provide for stable mounting of said plurality of disc packs by mating the tapered projection of one disc pack with the tapered cavity of adjacent disc pack.

7. A magnetic disc memory unit according to claim 2, wherein each hub further includes a plurality of pins projecting upright from the upper surface of said hub and the corresponding plurality of pin receiving holes formed on the underside of said hub, and wherein said drive shaft includes a spindle provided with a like plurality of pins, said corresponding pins and pinholes of adjacent discs and said spindle engaging one another for preventing relative rotation of said discs and spindle with respect to each other.

8. A magnetic disc memory unit according to claim 7, wherein each sleeve is provided with an upper flange portion for resting on said hub and further including a plurality of radially disposed pins and wherein said hub includes a plurality of slits, corresponding to the number of radially disposed pins for preventing the rotation of said sleeve relative to said hub.

9. A magnetic disc memory unit according to claim 8, wherein said lock screw is further provided with an annular projection and wherein said sleeve includes an annular fitting, and a thrust bearing coupled therewith for supporting said lock screw through the annular projection thereof to provide rotative support for said lock screw.

10. A magnetic disc memory unit according to claim 9, wherein the upper portion of each lock screw has a wall portion within which are provided a plurality of equally spaced apart holes, each having a respective ball disposed therein, and wherein said lock screw further includes a centrally located axial hole within which a piston is disposed, for vertically sliding movement therein, said piston being provided with a compression spring for biasing said piston downwardly within said centrally located axial hole, said piston including a radially extending flange for urging each of said balls disposed within said spaced apart holes radially outward from the axis of said disc pack, and also including a plurality of recesses formed in the outer periphery thereof, for entering into registration with said spaced apart holes when said piston is displaced upwardly.

11. A magnetic disc memory unit according to claim 10, further including an upper cover having a means for locking said cover to a lock screw of a disc pack, including a guide centrally located with respect to said lock screw and surrounding said lock screw, said guide having a plurality of ball coupling holes equal in number to the number of equally spaced apart holes within said lock screw wall, for receiving said balls urged outwardly by said flanges of said piston.

12. A magnetic disc memory unit according to claim 11, wherein each lock screw further includes a top surface portion having a plurality of equally spaced apart vertical holes and wherein said cover further includes a plurality of vertical pins equal in number and correspondingly spaced apart with respect to said equally spaced apart vertical holes within said top portion of said lock screw, for engagement therewith to affix the position of said cover with respect to said lock screw within said disc pack.

13. A magnetic disc memory unit according to claim 12, wherein said drive apparatus further includes a housing having ball bearings therein for supporting said spindle and a sleeve for maintaining a desired space between said ball bearings and said housing, and wherein said spindle further includes an external threaded lower portion onto which is threaded an internally threaded pulley for rotating said spindle.

14. A magnetic disc memory unit according to claim 13, wherein said drive apparatus further includes a belleville spring mounted below said pulley on said drive shaft on a spring seat, for urging said drive shaft downwardly to engage a switch mechanism, which is provided to detect a predetermined number of disc packs having been mounted on the driving shaft through which said disc packs are driven.

* * * * *